United States Patent
Ghulamali et al.

(10) Patent No.: US 12,401,929 B2
(45) Date of Patent: Aug. 26, 2025

(54) TECHNOLOGIES FOR REDUCING EVENT NOTIFICATIONS IN TELEMATICS SYSTEMS

(71) Applicant: CalAmp Corp., Irvine, CA (US)

(72) Inventors: Murtaza A. Ghulamali, Foothill Ranch, CA (US); Vishalgiri Goswami, Lake Forest, CA (US)

(73) Assignee: CalAmp Corp, Carlsbad, CA (US)

( * ) Notice: Subject to any disclaimer, the term of this patent is extended or adjusted under 35 U.S.C. 154(b) by 442 days.

(21) Appl. No.: 17/848,965

(22) Filed: Jun. 24, 2022

(65) Prior Publication Data

US 2023/0421930 A1    Dec. 28, 2023

(51) Int. Cl.
*H04Q 9/00* (2006.01)
*B60Q 9/00* (2006.01)

(52) U.S. Cl.
CPC ............... *H04Q 9/00* (2013.01); *B60Q 9/00* (2013.01); *H04Q 2209/823* (2013.01)

(58) Field of Classification Search
CPC ...... H04Q 9/00; H04Q 2209/823; B60Q 9/00; G08G 1/096775; G08G 1/0112; G08G 1/0133; G08G 1/0145
See application file for complete search history.

(56) References Cited

U.S. PATENT DOCUMENTS

| | | | |
|---|---|---|---|
| 6,167,448 A | 12/2000 | Hemphill et al. | |
| 9,331,926 B2 | 5/2016 | Oh et al. | |
| 9,977,579 B2 | 5/2018 | Yang et al. | |
| 10,328,204 B2 | 6/2019 | Davis et al. | |
| 10,347,373 B2 | 7/2019 | Brill et al. | |
| 10,394,546 B2 | 8/2019 | Hu et al. | |
| 10,710,456 B2 | 7/2020 | Mueller et al. | |
| 11,295,140 B2 | 4/2022 | Wang et al. | |
| 2003/0065788 A1 | 4/2003 | Salomaki | |
| 2004/0098491 A1 | 5/2004 | Costa-Requena et al. | |
| 2005/0135240 A1 | 6/2005 | Ozugur | |
| 2005/0154698 A1 | 7/2005 | Ikezawa et al. | |
| 2006/0149816 A1 | 7/2006 | Cadiz et al. | |
| 2006/0240803 A1 | 10/2006 | Valeriano et al. | |
| 2006/0286993 A1 | 12/2006 | Zie et al. | |

(Continued)

FOREIGN PATENT DOCUMENTS

| | | | |
|---|---|---|---|
| KR | 20060070419 A | 6/2006 | |
| WO | 2007069992 A1 | 6/2007 | |

*Primary Examiner* — Omeed Alizada
(74) *Attorney, Agent, or Firm* — Barnes & Thornburg LLP (57) ABSTRACT

Technologies for reducing event notifications in telematics systems includes a telematics server, a telematics device located in a vehicle, and a notification device. The telematics server receives telematics data from the telematics device and analyzes the telematics data based on an event model to determine whether an unexpected event has occurred. The event model includes a plurality of rules that define expected events related to the vehicle based on historical telematics data. The server generates a notification in response to a determination that the unexpected event has occurred and transmits the notification to the notification device, which may generate a notification to an end user. The event model may be generated and updated by the telematics server using an unsupervised and/or supervised machine learning algorithm based on the telematics data.

20 Claims, 7 Drawing Sheets

(56) References Cited

U.S. PATENT DOCUMENTS

2018/0124213 A1\* 5/2018 Wood ...................... H04L 47/50
2020/0363914 A1 11/2020 Dascola et al.
2023/0260046 A1\* 8/2023 Estes ................ G06Q 10/06315
                                                                          705/4

\* cited by examiner

TECHNOLOGIES FOR REDUCING EVENT NOTIFICATIONS IN TELEMATICS SYSTEMS

FIELD OF THE DISCLOSURE

The present disclosure relates generally to telematics and associated telematics devices and, more particularly, to telematics systems configured for providing notifications to end users.

BACKGROUND

Telematics involves the integrated use of telecommunications and informatics, particularly for application in vehicles. Telematics functionality may include, but is not limited to, recording vehicle information, emergency warning systems, navigation functionality, safety warnings, and automated driving assistance. Vehicle telematics devices may process and transmit telematics data and other messages generated by a vehicle and connected devices. For example, the telematics data may be produced by sensors, controllers, and/or other peripheral devices located on the vehicle and/or within the telematics device itself.

In some telematics systems, the vehicle telematics devices may transmit the locally collected telematics data to a telematics server. In typical telematics systems, especially those related to fleet operations, Transportation & Logistics (T&L), and Connected Vehicles, the telematics server may continually or periodically transmit notifications to an end user of the system, such as a fleet manager, a driver of the associated vehicle, or a customer of the service (e.g., a parent of a monitored child) based on the received telematics data to keep the end user informed and the telematics device up-to-date. However, such reoccurring notifications can consume a large amount of bandwidth and become excessive and unmanageable for the end user.

SUMMARY

According to an aspect of the present disclosure, a telematics server for providing notifications to a telematics device of a vehicle may include an event model, a device interface, and a notification manager. The event model may include a plurality of rules that each define an expected event based on historical telematics data of the vehicle. The device interface may be configured to receive telematics data from the telematics device, and the telematics data may define one or more characteristics of the vehicle. The notification manager may be configured to analyze the telematics data using the event model to determine whether an unexpected event has occurred and, in response to a determination that the unexpected event has occurred, generate a notification. The device interface may be further configured to transmit the notification to a notification device.

In some embodiments, the notification manager may be configured to update the event model based on the telematics data received from the telematics device or based on feedback received from the notification device using a machine learning engine. Additionally, in some embodiments, the notification may instruct the notification device to generate an alert. Additionally or alternatively, the notification may be configured to provide information related to the unexpected event to a user of the notification device. In some embodiments, the telematics server may further include a model manager including a machine learning engine configured to generate the event model based on the historical telematics data using unsupervised learning.

Additionally, in some embodiments, to analyze the telematics data may include to analyze the telematics data based on a temporal-based rule of the event model. In such embodiments, the temporal-based rule may define an expected temporal event related to the vehicle based on the historical telematics data. Additionally, in some embodiments, to analyze the telematics data may include to analyze the telematics data based on a location-based rule of the event model. In such embodiments, the location-based rule may define an expected location of the vehicle based on historical telematics data. Additionally, in some embodiments, to analyze the telematics data may include to analyze the telematics data based on a historical-based rule of the event model. In such embodiments, the historical based rule may define an expected activity related to the vehicle based on the historical telematics data. Additionally, in some embodiments, to analyze the telematics data may include to analyze the telematics data based on a sequential-based rule of the event model. In such embodiments, the sequential-based rule may define an expected event related to the vehicle given an occurrence of a prior event related to the vehicle. Additionally, in some embodiments, to analyze the telematics data may include to analyze the telematics data based on a relational-based rule of the event model. In such embodiments, the relational-based rule may define an expected characteristic of the vehicle given a state of another characteristic of the vehicle.

According to another aspect of the present disclosure, a method for providing notifications to a telematics device of a vehicle may include receiving, by a telematics server, telematics data from the telematics device; analyzing, by the telematics server, the telematics data using an event model managed by the telematics server to determine whether an unexpected event has occurred; generating, by the telematics server and in response to a determination that the unexpected event has occurred, a notification; and transmitting, by the telematics server, the notification to a notification device. The telematics data may define one or more characteristics of the vehicle, and the event model may include a plurality of rules that each define an expected event based on historical telematics data.

In such embodiments, the method may further include updating, by the telematics server, the event model based on the telematics data received from the telematics device or based on feedback received from the notification device using a machine learning engine. Additionally, in some embodiments, the notification may instruct the notification device to generate an alert or is configured to provide information related to the unexpected event to a user of the notification device.

Additionally, in some embodiments, analyzing the telematics data may include analyzing the telematics data based on a temporal-based rule of the event model. In such embodiments, the temporal-based rule may define an expected temporal event related to the vehicle based on the historical telematics data. Additionally, in some embodiments, analyzing the telematics data may include analyzing the telematics data based on a location-based rule of the event model. In such embodiments, the location-based rule may define an expected location of the vehicle based on historical telematics data. Additionally, in some embodiments, analyzing the telematics data may include analyzing the telematics data based on a historical-based rule of the event model. In such embodiments, the historical based rule may define an expected activity related to the vehicle based on the historical telematics data. Additionally, in some embodiments, analyzing the telematics data may include analyzing the telematics data based on a sequential-based rule of the event model. In such embodiments, the sequential-based rule may define an expected event related to the vehicle given an occurrence of a prior event related to the vehicle. Additionally, in some embodiments, analyzing the telematics data may include analyzing the telematics data based on a relational-based rule of the event model. In such embodiments, the relational-based rule may define an expected characteristic of the vehicle given a state of another characteristic of the vehicle.

According to yet another aspect of the present disclosure, one or more non-transitory, computer-readable storage media comprising a plurality of instructions that, in response to execution, cause a telematics server to receive telematics data from the telematics device, analyze the telematics data using an event model managed by the telematics server to determine whether an unexpected event has occurred, generate, in response to a determination that the unexpected event has occurred, a notification, and transmit the notification to a notification device. In some embodiments, the telematics data defines one or more characteristics of the vehicle, and the event model includes a plurality of rules that each define an expected event based on historical telematics data. Additionally in some embodiments, the plurality of instructions, in response to execution, may further cause the telematics server to update the event model based on the telematics data received from the telematics device or based on feedback received from the notification device using a machine learning engine.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
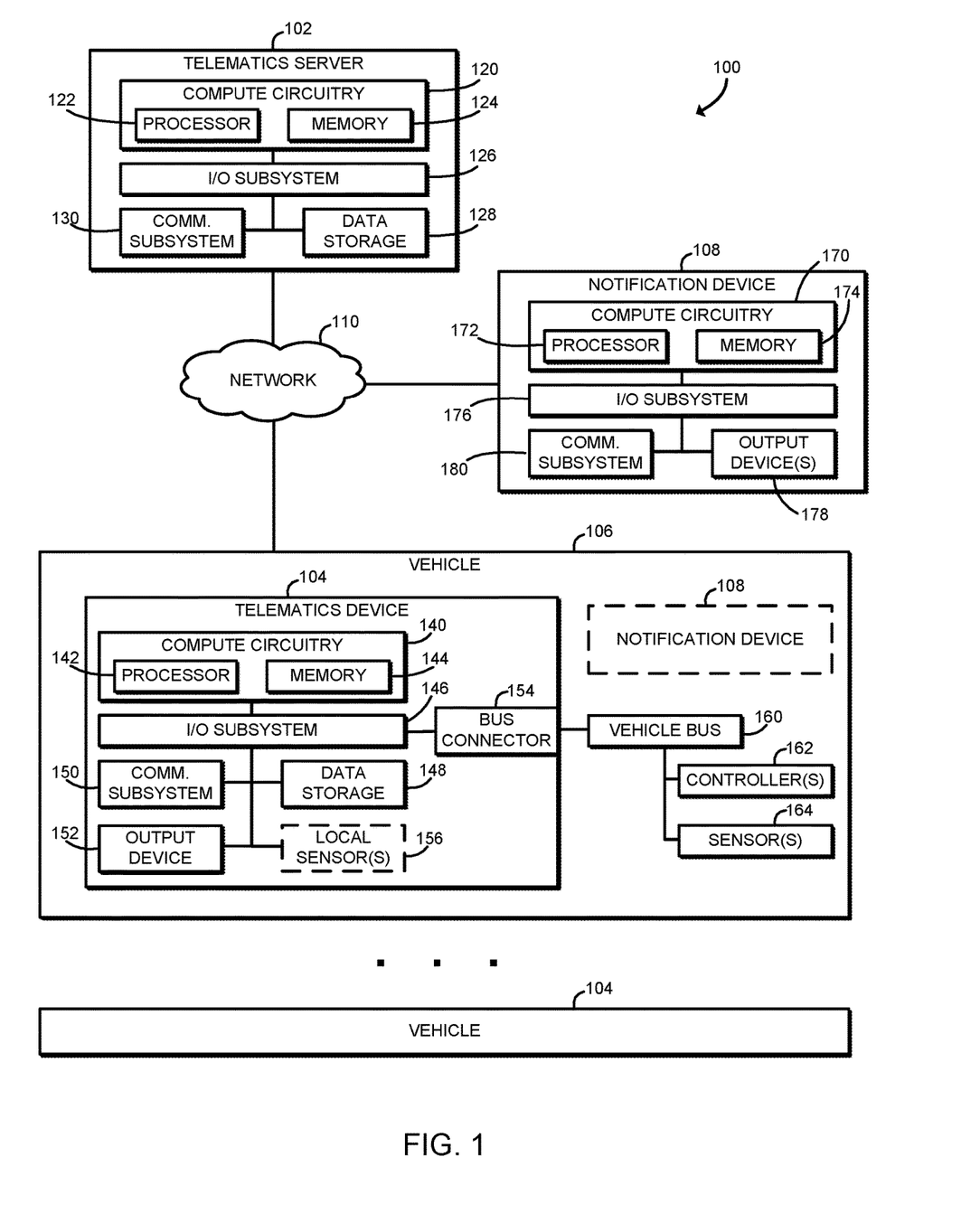
FIG. 1 is a simplified block diagram of at least one embodiment of a telematics system for reducing event notifications to a telematics device.

Referring now to FIG. 1, an illustrative telematics system 100 for providing notifications to a telematics device includes a telematics server 102, a telematics device 104 installed in a vehicle 106, and a notification device 108. Each of the telematics device 104 and the notification device 108 are in communication with the telematics server 102 over a network 110. In use, as described in more detail below, the telematics server 102 receives telematics data from the telematics device 104 via the network 110, analyzes the telematics data based on an event model (e.g., a machine learning model) to determine whether an unexpected event has occurred as indicated by the telematics data, and transmits a notification to the notification device 108 via the network 110 if the occurrence of an unexpected event has been detected. As such, the overall bandwidth of notifications between the telematics server 102 and the notification device 108 may be reduced by transmitting only notifications regarding unexpected events (e.g., the vehicle 106 is in an unexpected location, the vehicle 106 has failed to arrive at a location at an expected time, the vehicle 106 is traveling an unexpected rate of speed, etc.). In some embodiments as discussed in more detail below, the event model may be constructed, updated, and/or maintained using a machine learning algorithm based on received telematics data such that the expected behavior of the vehicle 106 can be more accurately determined over time.

The telematics server 102 may be embodied as any type of computation or computer device capable of performing the functions described herein, including, without limitation, a server, a rack-mounted server, a blade server, a workstation, a network appliance, a web appliance, a desktop computer, a laptop computer, a tablet computer, a smartphone, a consumer electronic device, a distributed computing system, and/or a multiprocessor system. Additionally, in some embodiments, the telematics server 102 may be embodied as a "virtual server" formed from multiple computing devices distributed across the network 110 and operating in a public or private cloud. Accordingly, although the telematics server 102 is illustrated in FIG. 1 as embodied as a single computing device, it should be appreciated that the telematics server 102 may be embodied as multiple devices cooperating together to facilitate the functionality described below.

As shown in FIG. 1, the illustrative telematics server 102 includes compute circuitry 120, an I/O subsystem 126, a data storage device 128, and a communication subsystem 130. Of course, the telematics server 102 may include other or additional components, such as those commonly found in a typical server or other computer (e.g., various input/output devices), in other embodiments. Additionally, in some embodiments, one or more of the illustrative components may be incorporated in, or otherwise form a portion of, another component.

The compute circuitry 120 may be embodied as any type of device or collection of devices capable of performing various compute functions. In some embodiments, the compute circuitry 120 may be embodied as a single device such as an integrated circuit, an embedded system, a field-programmable-array (FPGA), a system-on-a-chip (SOC), or other integrated system or device. Additionally, in some embodiments, the compute circuitry 120 includes or is embodied as a processor 122 and memory 124. The processor 122 may be embodied as any type of processor capable of performing the functions described herein. For example, the processor 122 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the telematics server 102 such as operating systems, applications, programs, libraries, and drivers.

The compute circuitry 120 is communicatively coupled to other components of the telematics server 102 via the I/O subsystem 126, which may be embodied as circuitry and/or components to facilitate input/output operations with compute circuitry 120 (e.g., with the processor 122 and/or memory 124) and other components of the telematics server 102. For example, the I/O subsystem 126 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may be incorporated, along with the processor 122, the memory 124, and other components of the telematics server 102, into the compute circuitry 120.

The data storage device 128 may be embodied as any type of device or devices configured for short-term or long-term storage of data such as, for example, memory devices and circuits, memory cards, hard disk drives, solid-state drives, or other data storage devices. The communication subsystem 130 of the telematics server 102 may be embodied as any communication circuit, device, or collection thereof, capable of enabling communications between the telematics server 102, the telematics device 104, the notification device 108, and/or other remote devices. The communication subsystem 130 may be configured to use any one or more communication technology (e.g., wireless or wired communications) and associated protocols (e.g., Ethernet, Bluetooth®, Bluetooth Low Energy (BLE), Wi-Fi®, WiMAX, 3G LTE, 5G, etc.) to effect such communication.

The telematics system 100 may include multiple vehicles 106 (e.g., a fleet of vehicle 106), each of which may include an associated telematics device 104. Each telematics device 104 may be embodied as any type of device capable of performing the functions described herein. For example, the telematics device 104 may be embodied as, without limitation, a mobile computing device, an embedded device, a computer, a laptop computer, a notebook computer, a tablet computer, a wearable computing device, a multiprocessor system, a network appliance, a distributed computing system, a processor-based system, and/or a consumer electronic device. In the illustrative embodiment, each telematics device 104 is a special-purpose computing device configured to collecting and transmitting telematics data, which defines one or more characteristics of the vehicle (e.g., the present location or speed of the vehicle, the type of cargo carried by the vehicle, vehicle operation parameters, vehicle occupancy data, etc.). For example, as discussed below, the telematics device 104 may be configured to be coupled to a communication bus (e.g., a Controller Area Network bus) of the vehicle 106.

As shown in FIG. 1, the illustrative telematics device 104 includes compute circuitry 140, an I/O subsystem 146, a data storage device 148, a communication subsystem 150, one or more output devices 152, a bus connector 154, and, in some embodiments, local sensors 156. Of course, the telematics device 104 may include other or additional components, such as those commonly found in a portable or embedded computer (e.g., various input/output devices), in other embodiments. Additionally, in some embodiments, one or more of the illustrative components may be incorporated in, or otherwise form a portion of, another component.

The compute circuitry 140 may be embodied as any type of device or collection of devices capable of performing various compute functions. In some embodiments, the compute circuitry 140 may be embodied as a single device such as an integrated circuit, an embedded system, a field-programmable-array (FPGA), a system-on-a-chip (SOC), or other integrated system or device. Additionally, in some embodiments, the compute circuitry 140 includes or is embodied as a processor 142 and memory 144. The processor 142 may be embodied as any type of processor capable of performing the functions described herein. For example, the processor 142 may be embodied as a single or multi-core processor(s), digital signal processor, microcontroller, or other processor or processing/controlling circuit. Similarly, the memory 144 may be embodied as any type of volatile or non-volatile memory or data storage capable of performing the functions described herein. In operation, the memory 144 may store various data and software used during operation of the telematics device 104 such as operating systems, applications, programs, libraries, and drivers.

The compute circuitry 140 is communicatively coupled to other components of the telematics device 104 via the I/O subsystem 146, which may be embodied as circuitry and/or components to facilitate input/output operations with compute circuitry 140 (e.g., with the processor 142 and/or memory 144) and other components of the telematics device 104. For example, the I/O subsystem 146 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 146 may be incorporated, along with the processor 142, the memory 144, and other components of the telematics device 104, into the compute circuitry 140.

The data storage device 148 may be embodied as any type of device or devices configured for short-term or long-term storage of data such as, for example, memory devices and circuits, memory cards, hard disk drives, solid-state drives, or other data storage devices. The communication subsystem 150 of the telematics device 104 may be embodied as any communication circuit, device, or collection thereof, capable of enabling communications between the telematics device 104, the telematics server 102, and/or other remote devices. The communication subsystem 150 may be configured to use any one or more communication technology (e.g., wireless or wired communications) and associated protocols (e.g., Ethernet, Bluetooth®, Bluetooth Low Energy (BLE), WiMAX, 3G LTE, 5G, etc.) to effect such communication.

The output device(s) 152 may be embodied as any type of output device capable of presenting an output or information to a driver of the vehicle 106. For example, the output device 152 may be embodied as, or otherwise include, a visual output device such as a display screen, an audible output device such as a speaker or buzzer, and/or a tactile output device such as a vibration transducer.

The bus connector 154 may be embodied as any type of vehicle diagnostic connector capable of interfacing with a vehicle bus 160 of the vehicle 106 to receive telemetry data from the components of the vehicle 106 as discussed below. For example, in the illustrative embodiment, the bus connector 154 is embodied as a vehicle diagnostic connector configured to mate with an OBD-II port of the vehicle 106. In other embodiments, however, the telematics device 104 may be directly connected or otherwise coupled to the vehicle bus 160 with a wiring harness or other connector/connections.

The local sensor(s) 156 may be embodied as any type of sensors located on the telematics device 104 and capable of producing telematics data. For example, the local sensors 156 may be embodied as, or otherwise include, location sensors, accelerometers, gyroscopes, temperature sensors, and/or other sensors.

As shown, each telematics device 104 is coupled to or otherwise included in a corresponding vehicle 106. Each vehicle 106 may be embodied as, without limitation, a heavy truck, a fleet vehicle, a garbage truck, a snow plow, a dump truck, a bus, a light truck, a passenger car, an airplane, a water craft, or other vehicle. Additionally or alternatively, in some embodiments, the telematics device 104 may be coupled to another asset such as a shipping pallet, a tool cage, a restricted access room, a section of the warehouse, or any other device or location that may be monitored or tracked using a telematics device 104. Illustratively, the vehicle 106 is a vehicle, and the telematics device 104 is configured to monitor operating conditions or characteristics of the vehicle 106 and to communicate telematics data indicative of the operating conditions of the vehicle 106 to the telematics server 102.

As discussed above, the illustrative vehicle 106 further includes the vehicle bus 160, which may be coupled to multiple connected devices such as controllers 162 and sensors 164 of the vehicle 106. The vehicle bus 160 may be embodied as a controller area network (CAN) bus, a local area network, a wireless network, or another communications network that allows various components of the vehicle 106 and/or peripheral devices to communicate. As discussed above, the telematics device 104 may be coupled to the vehicle bus 160 via the bus connector 154 or via other mechanisms (e.g., a direct connection).

Each of the controllers 162 may be embodied as an electronic control unit (ECU), an engine controller, a vehicle controller, a microcontroller, or other embedded computing resource of the vehicle 106. Each controller 162 may provide engine telemetry, ignition signals, odometer signals, or other vehicle telemetry data over the vehicle bus 160. Each of the sensors 164 may be embodied as a location sensor (e.g., a GPS receiver), a speed sensor, a temperature sensor, an environmental sensor, a weight sensor, a vehicle- or application-specific sensor such as a snow plow position sensor, a fork lift position sensor, a tire pressure sensor, a door state sensor, or other sensor device configured to provide sensor data over the vehicle bus 132. Although illustrated in FIG. 1 as being coupled to the telematics device 104 via the vehicle bus 160, it should be understood that in some embodiments one or more of the controllers 162 and/or the sensors 164 may be coupled directly to the telematics device 104 via Bluetooth Low Energy (BLE), wireless networking (WiFi), a direct serial connection, or other connection.

The notification device 108 may be embodied as any type computation or computer device capable of receiving and providing notifications to a user and performing the functions described herein, including, without limitation, a mobile communication device, a smartphone, a desktop computer, a laptop computer, a tablet computer, a custom-built computer, a server, a rack-mounted server, a blade server, a workstation, a network appliance, a web appliance, a consumer electronic device, a distributed computing system, and/or a multiprocessor system. For example, in some embodiments, the notification device 108 may be embodied as a fleet operation computer capable of managing the fleet of vehicles 106 and performing the functions described herein. In other embodiments, the notification device 108 may be embodied as a mobile communication device, such as a smartphone, carried and used by an end user (e.g., a driver of the vehicle 106). Furthermore, in some embodiments, the notification device 108 may be embodied as or otherwise incorporated into the telematics device 104 and/or installed in the vehicle 106 as shown in FIG. 1 in dashed lines. Additionally, in some embodiments, the notification device 108 may be embodied as a "virtual computer" formed from multiple computing devices distributed across the network 110 and operating in a public or private cloud.

As shown in FIG. 1, the illustrative notification device 108 includes compute circuitry 170, an I/O subsystem 176, an output device 178 and a communication subsystem 180. Of course, the notification device 108 may include other or additional components, such as those commonly found in a computer, smartphone, or other computing device (e.g., various input/output devices), in other embodiments. Additionally, in some embodiments, one or more of the illustrative components may be incorporated in, or otherwise form a portion of, another component.

The compute circuitry 170 may be embodied as any type of device or collection of devices capable of performing various compute functions. In some embodiments, the compute circuitry 170 may be embodied as a single device such as an integrated circuit, an embedded system, a field-programmable-array (FPGA), a system-on-a-chip (SOC), or other integrated system or device. Additionally, in some embodiments, the compute circuitry 170 includes or is embodied as a processor 172 and memory 174. The processor 172 may be embodied as any type of processor capable of performing the functions described herein. For example, the processor 172 may be embodied as a single or multi-core processor(s), digital signal processor, microcontroller, or other processor or processing/controlling circuit. Similarly, the memory 174 may be embodied as any type of volatile or non-volatile memory or data storage capable of performing the functions described herein. In operation, the memory 174 may store various data and software used during operation of the notification device 108 such as operating systems, applications, programs, libraries, and drivers.

The compute circuitry 170 is communicatively coupled to other components of the notification device 108 via the I/O subsystem 176, which may be embodied as circuitry and/or components to facilitate input/output operations with compute circuitry 170 (e.g., with the processor 172 and/or memory 174) and other components of the notification device 108. For example, the I/O subsystem 176 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 176 may be incorporated, along with the processor 172, the memory 7, and other components of the notification device 108, into the compute circuitry 170.

The output device(s) 178 may be embodied as any type of output device capable of presenting an output or information to a user of the notification device 108. For example, the output device 178 may be embodied as, or otherwise include, a visual output device such as a display screen, an audible output device such as a speaker or buzzer, and/or a tactile output device such as a vibration transducer.

The communication subsystem 180 of the notification device 108 may be embodied as any communication circuit, device, or collection thereof, capable of enabling communications between the notification device 108, the telematics server 102, and/or other remote devices. The communication subsystem 180 may be configured to use any one or more communication technology (e.g., wireless or wired communications) and associated protocols (e.g., Ethernet, Bluetooth®, Bluetooth Low Energy (BLE), Wi-Fi®, WiMAX, 3G LTE, 5G, etc.) to effect such communication.

As discussed in more detail below, the telematics server 102 is configured to communicate with the telematics device 104 and the notification device 110 and/or other devices of the telematics system 100 over the network 110. The network 110 may be embodied as any number of various wired and/or wireless networks. For example, the network 110 may be embodied as, or otherwise include, a wired or wireless local area network (LAN), a wired or wireless wide area network (WAN), a cellular network, and/or a publicly-accessible, global network such as the Internet. As such, the network 110 may include any number of additional devices, such as additional computers, routers, stations, and switches, to facilitate communications among the devices of the system 100.

Figure 2:
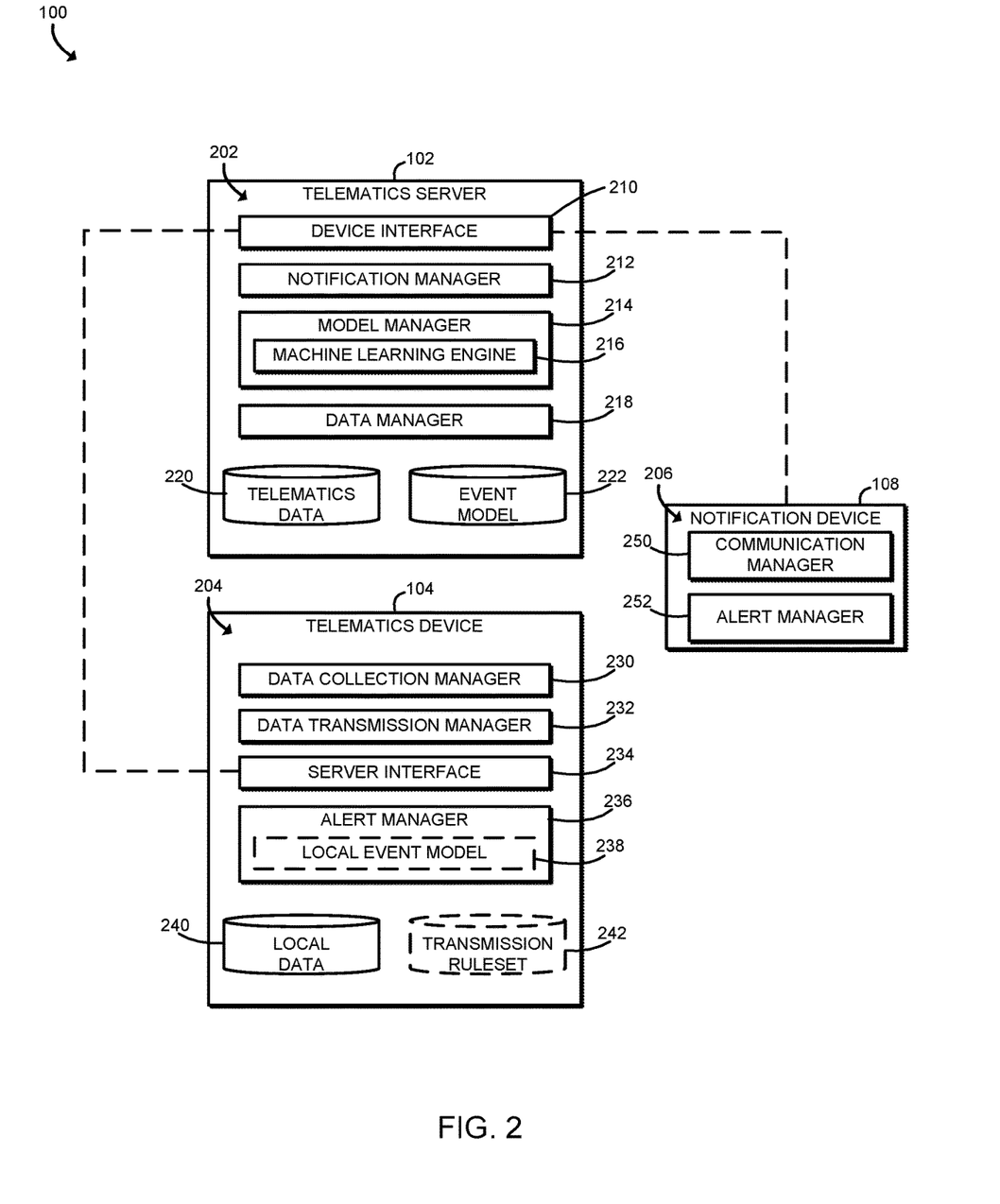
FIG. 2 is a simplified block diagram of various environments that may be established by the telematics system of FIG. 1.

Referring now to FIG. 2, in the illustrative embodiment, the telematics server 102 is configured to establish an environment 202 during operation. The illustrative environment 202 includes a device interface 210, a notification manager 212, a model manager 214, a data manager 218 and various data sets including telematics database 220 and an event model 222. The various components of the environment 202 may be embodied as hardware, firmware, software, or a combination thereof. As such, in some embodiments, one or more of the components of the environment 202 may be embodied as circuitry or a collection of electrical devices (e.g., device interface circuitry 210, notification manager circuitry 212, ruleset manager circuitry 214, data and/or manager circuitry 218). It should be appreciated that, in such embodiments, one or more of those components may form a portion of the processor 122, the I/O subsystem 126, and/or other components of the telematics server 102.

The device interface 210 is configured to establish communications with the telematics device 104 and the notification device 110. In use, the device interface 210 receives telematics data from the telematics device 104 and, when appropriate, transmits a notification to the notification device 110 based on an analysis of the received telematics data as discussed below. The notification may be embodied as any type of notification. For example, in some embodiments, the notification may include instructions for the notification device 110. For example, the notification may instruct the notification device 110 to generate an alert. Additionally or alternatively, the notification may be configured to provide information to the user of the notification device 110 (e.g., information regarding the determined unexpected event), which the notification device 110 may present to the user via the output device 178.

The notification manager 212 is configured to analyze the telematics data received from the telematics device 104 and determine whether an unexpected event has occurred based on the event model 222. That is, the notification manager 212 compares the received telematics data to one or more rules included in or otherwise defined by the event model 222 to determine whether the telematics data define an unexpected (e.g., abnormal) event based on historical telematics data. As discussed in more detail below, the event model 222 includes a number of rules which define an expected operational condition or characteristic of the vehicle 106 (i.e., expected telematics data). For example, the event model 222 may include temporal-based rules, location-based rules, historical based rules, sequential-based rules, relational-based rules, and/or other types of rules that define expected telematics data. In some embodiments, for example, the event model 222 may include a rule that indicates the vehicle 106 is typically at a particular location at a particular time. In such embodiment, if the received telematics data does not indicate that the vehicle 106 is located at the expected location, the notification manager 212 may determine that an unexpected event has occurred and generate an associated notification for transmission to the notification device 108. Other operational aspects of the vehicle 106 may also be monitored for unexpected events such as sudden changes in the driving pattern of the vehicle 106 such as excessive acceleration, excessive declaration, and/or lane departures.

The model manager 214 is configured to construct, maintain, and update the event model 222 based on newly received telematics data and, in some embodiments, feedback from the user of the notification device(s) 108. As discussed above, the event model 222 includes a number of rules that define an expected operational condition or characteristic of the vehicle 106 (i.e., expected telematics data) based on historical telematics data. The model manager 214 may initially define those rules during an initial training period during which telematics data is monitored using an unsupervised machine learning algorithm (e.g., to identify commonality in the telematics data). Over time, the model manager 214 is configured to continually update the event model 222 such that the rules of the event model 222 define the presently expected operational conditions and/or characteristics of the vehicle 106. To do so, in some embodiments, the model manager 214 may include a machine learning engine 216 configured to monitor the received telematics data overtime and update the event model 222 based on "learned" operational conditions and/or characteristics of the vehicle 106. In this way, the event model 222 can be maintained in a current form without manual updating. Additionally, the user of the notification device 108 may provide feedback based on generated notifications, which the model manager 214 may use to further update the event model 222 using a type of supervised machine learning algorithm.

The data manager 218 is configured to manage the telematics data received from the various telematics devices 104. For example, the data manager 218 stores the received telematics data in the telematics database 220. To do so, the data manager 218 may utilize any suitable storage paradigm.

Still referring to FIG. 2, in the illustrative embodiment, the telematics device 104 establishes an environment 204 during operation. The illustrative environment 204 includes a data collection manager 230, a data transmission manager 232, a server interface 234, an alert manager 236 and various data sets including a local telematics database 240 and, in some embodiments, a transmission ruleset 242. Similar to environment 202, the various components of the environment 204 may be embodied as hardware, firmware, software, or a combination thereof. As such, in some embodiments, one or more of the components of the environment 204 may be embodied as circuitry or a collection of electrical devices (e.g., data collection manager circuitry 230, data transmission manager circuitry 232, server interface circuitry 234, and/or alert manager circuitry 236). It should be appreciated that, in such embodiments, one or more of those components may form a portion of the processor 142, the I/O subsystem 146, and/or other components of the telematics device 104.

The data collection manager 230 is configured to collect telematics data from various controllers 162 and/or sensors 164 of the vehicle 106. As discussed above, in some embodiments, the telematics device 104 may receive such telematics data via the vehicle bus 160 and bus connector 154. Additionally, in embodiments in which the telematics device 104 includes the local sensors 156, the data collection manager 230 may also receive or collect telematics data from the local sensors 156. In doing so, the data collection manager 230 may utilize any suitable data collection scheme including, for example, data pushes, data pulls, and/or data doorbells. As such, the telematics data may be sampled or received according to any suitable data acquisition scheme.

The data transmission manager 232 is configured to manage the transmission of the telematics data from the telematics device 104 to the telematics server 102. To do so, the data transmission manager 232 may use any suitable transmission schedule to transfer the telematics data to the telematics server 102. For example, in some embodiments, the data transmission manager 232 may be transmit the telematics data as it is received from the various controllers 162, sensors 164, and/or sensors 156. In other embodiments, the data transmission manager 232 may transmit the telematics data based on a schedule set forth in the transmission ruleset 242. That is, the transmission ruleset 242 may define a set of rules that dictate a frequency at which the telematics data should be transmitted. For example, the transmission ruleset 242 may define a batch timing (e.g., every 30 seconds) at which all collected telematics data is to be transmitted, a data threshold amount at which the collected telematics data is to be transmitted, and/or other conditions under which the telematics data should be transmitted to the telematics server 102. In some embodiments, the transmission rules may be based on the type of telematics data (e.g., important telematics data may be transmitted at a higher frequency than non-important telematics data).

The server interface 234 is configured to establish communications with the telematics server 102. In use, the server interface 234 transmits the telematics data when instructed to do so by the data transmission manager 232. Additionally, in some embodiments (e.g., those embodiments in which the telematics device 104 includes or is embodied as the notification device 108), the server interface 234 may receive notifications transmitted by the telematics server 102 (as well as any other data), based on the transmitted telematics data.

In embodiments in which the telematics device 104 includes or is embodied as the notification device 108, the alert manager 236 is configured to manage the notifications received from the telematics server 102. In embodiments in which the notification includes instructions, the alert manager 236 is configured to execute the instructions of the received notification. For example, the alert manager 236 may activate an alert device of the telematics device 104 and/or vehicle 106 based on the notification. Additionally or alternatively, in embodiments in which the notification includes information to be provided to the driver, the alert manager 236 is configured to present the information to the driver via the output device 152 (e.g., via a display screen or speaker).

In some embodiments, the alert manager 236 may include a local event model 238. The local event model 238 may be a copy of the event model 222, or a subset thereof, and is received by the telematics device 104 from the telematics server 102. In such embodiments, the alert manager 236 may be further configured to operate in a manner similar to the notification manager 212 of the telematics server 102. That is, the alert manager 236 may locally analyze the telematics data to determine whether an unexpected event has occurred based on the local event model 238 similar to the functionality of the notification manager 212 discussed above.

Continuing reference to FIG. 2, in the illustrative embodiment, the notification device 108 establishes an environment 206 during operation. The illustrative environment 206 includes a communication manager 250 and an alert manager 252. Similar to environments 202 and 204, the various components of the environment 206 may be embodied as hardware, firmware, software, or a combination thereof. As such, in some embodiments, one or more of the components of the environment 206 may be embodied as circuitry or a collection of electrical devices (e.g., communication manager circuitry 250 and/or notification manager circuitry 252). It should be appreciated that, in such embodiments, one or more of those components may form a portion of the processor 172, the I/O subsystem 176, and/or other components of the notification device 108.

The communication manager 250 is configured to manage communications of the notification device 108. In use, the communication manager 250 receives notifications from the telematics server 102. Additionally, in some embodiments as discussed in more detail below, the communication manger 250 may transmit user feedback to the telematics server 102. Such feedback may be based on the received notifications.

The alert manager 252 is configured to manage the notifications received from the telematics server 102. In embodiments in which the notification includes instructions, the alert manager 252 is configured to execute the instructions of the received notification. For example, in embodiments in which the notification includes information to be provided to the user, the alert manager 252 is configured to present the information to the user via the output device 178 (e.g., via a display screen or speaker). Additionally, in embodiments in which the notification includes instructions, the alert manager 252 may activate an alert device (e.g., a visual, tactile, or audible alert device) of the notification device 108 based on the notification.

Figure 3:
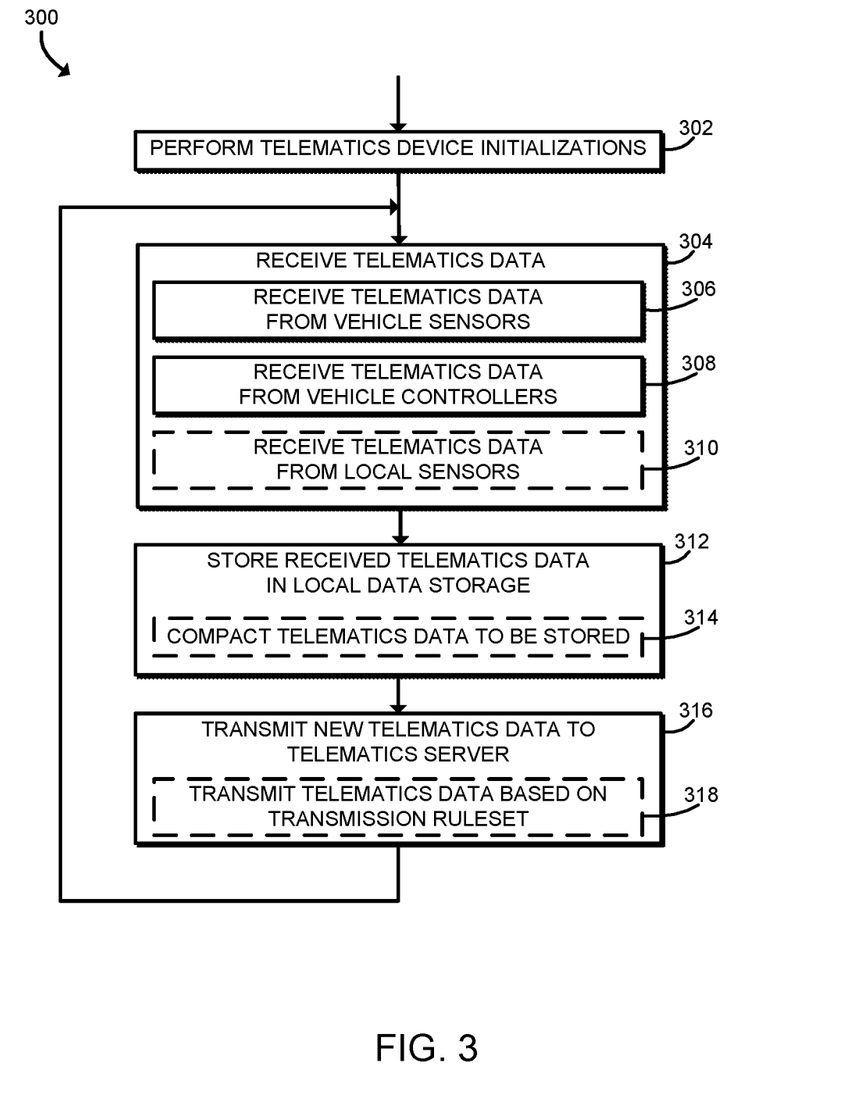
FIG. 3 is a simplified flow diagram of at least one embodiment of a method for managing telematics data that may be executed by a vehicle telematics device of the telematics system of FIGS. 1 and 2.

Referring now to FIG. 3, in use, the telematics device 104 may execute a method 400 for managing telematics data. It should be appreciated that, in some embodiments, the operations of the method 300 may be performed by one or more components of the environment 204 of the telematics device 104 as shown in FIG. 2.

The method 300 begins with block 302, in which the telematics device 104 may perform various initializations procedures. For example, the telematics device 104 may load an operating system and/or various software or software extensions in block 302 as part of a power-up cycle. Subsequently, in block 304, the telematics device 104 receives telematics data. For example, in block 306, the telematics device 104 may receive the telematics data from one or more vehicle sensors 164. Additionally or alternatively, in block 308, the telematics device 104 may receive the telematics data from one or more vehicle controllers 162. Furthermore, in embodiments in which the telematics device 104 includes the local sensors 156, the telematics device 104 may receive telematics data from the local sensors 156 in block 310.

In block 312, the telematics device stores the received telematics data in the local database 240. In doing so, in some embodiments, the telematics device 104 may compact the telematics data in block 314. For example, the telematics device 104 may use a suitable compression algorithm or saving schema to reduce the overall size of the saved telematics data. Regardless, in block 316, the telematics device 104 transmits the newly received telematics data to the telematics server 102. In doing so and as discussed above, the telematics device 104 may be configured to transmit the telematics data as it is received from the sensors 164, controllers 162, and/or local sensors 156. Alternatively, in other embodiments in block 318, the telematics server 102 may be configured to transmit the telematics data based on a schedule set forth in the transmission ruleset 242 as discussed above.

Figure 4:
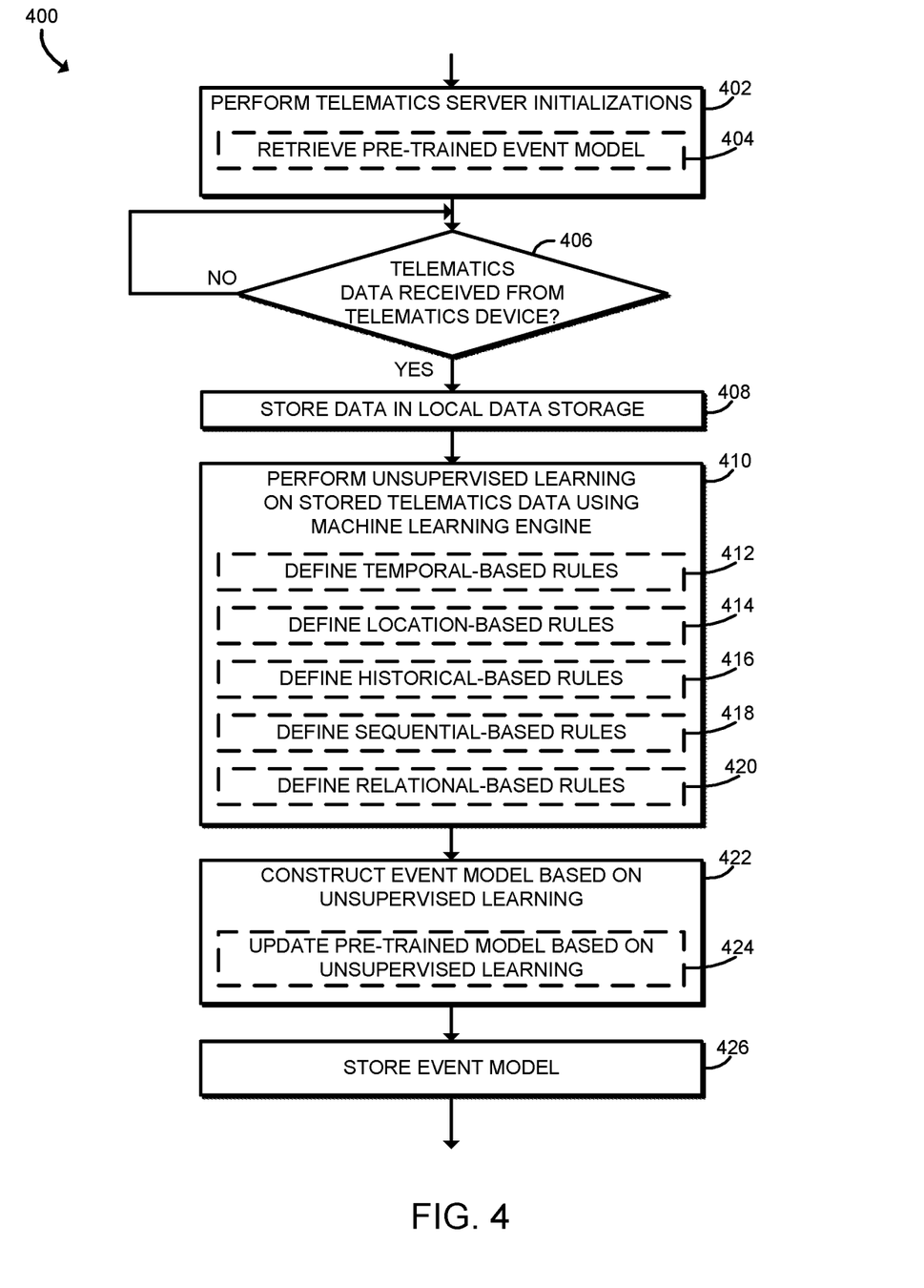
FIG. 4 is a simplified flow diagram of at least one embodiment of a method for constructing an event model for analyzing telematics data that may be executed by a telematics server of the telematics system of FIGS. 1 and 2.

Referring now to FIG. 4, in use, the telematics server 102 may execute a method 400 for constructing the event model 222 to facilitate analyzing telematics data. It should be appreciated that, in some embodiments, the operations of the method 400 may be performed by one or more components of the environment 202 of the telematics server 102 as shown in FIG. 2.

The method 400 begins with block 402, in which the telematics server 102 may perform various initializations procedures. For example, the telematics server 102 may load an operating system and/or various software or software extensions in block 402 as part of a power-up cycle. In some embodiments, in block 404, the telematics server 102 may retrieve, receive, or otherwise obtain a pre-trained event model 222. The pre-trained event model 222 may include a number of predefined or pre-established rules, including predefined temporal-based rules, predefined location-based rules, predefined historical-based rules, pre-defined sequential-based rules, predefined relational-based rules, and/or other rules and/or conditions. Such predefined rules may be manually defined in the pre-trained event model 222 or may be constructed during a training session using training telematics data. For example, the pre-trained event model 222 may define "global" rules that are applicable to a whole set or range of telematics devices 104 or otherwise considered universal.

After the telematics server 102 has performed the various initialization procedures in block 402, the telematics server 102 monitors for telematics data from the telematics device 104 in block 406. If telematics data is received in block 506, the method 400 advances to block 408 in which the telematics server 102 stores the received telematics data in the local telematics database 220.

Subsequently, in block 410, the model manager 214 of the telematics server 102 performs unsupervised learning on the received and stored telematics data using the machine learning engine 216. The learning is unsupervised in that the telematics data is unlabeled from the driver of the vehicle 106 or other user. In performing the unsupervised learning on the receive telematics data, the telematics server defines one or more rules of the event model 222. For example, in block 412, the telematics server 102 may define one or more temporal-based rules. Each temporal-based rule may define an expected temporal operational condition and/or characteristic of the vehicle 106. For example, a temporal-based rule may define an expected time period of operation of the vehicle 106, an expected time at which the vehicle 106 should be started or stopped, an expected time at which the vehicle 106 should be located at a particular location, an expected completion time of a trip, and/or other time-based operational conditions and/or characteristics. In block 414, the telematics server 102 may define one or more location-based rules. Each location-based rule may define an expected location-related operational condition and/or characteristic of the vehicle 106. For example, a locational-based rule may define a geofenced area of operation for the vehicle 106, an expected location of the vehicle 106, an expected route of the vehicle 106, and/or other location-based operational conditions and/or characteristics.

In block 416, the telematics server 102 may define one or more historical-based rules. Each historical-based rule may define an expected operational condition and/or characteristic of the vehicle 106 given the past telematics data. For example, a historical based rule may define an expected maintenance of the vehicle 106 based on a previous maintenance of the vehicle 106, an expected speed (or max speed) of the vehicle 106 based on a previous speed or location of the vehicle 106, and/or other historical-based operational conditions and/or characteristics. In block 418, the telematics server 102 may define one or more sequential-based rules. Each sequential-based rule may define an expected operational condition and/or characteristic of the vehicle 106 given an immediate past operational condition and/or characteristic of the vehicle 106. For example a sequential-based rule may define an expected location of the vehicle 106 based on the immediately prior location of the vehicle 106, an expected weight of the vehicle based on the immediately prior location of the vehicle 106, and/or other historical-based operational conditions and/or characteristics. In block 420, the telematics server 102 may manually define one or more relational-based rules. Each relational-based rule may define an expected operational condition and/or characteristic of the vehicle 106 given the existence of another operational condition and/or characteristic of the vehicle 106. For example, a relational-based rule may define an expected cargo of the vehicle 106 given a present location of the vehicle 106, an expected max speed of the vehicle 106 given a present location of the vehicle 106, an expected operation start time given the particular day of the week, and/or other relational-based operational conditions and/or characteristics. In some embodiments, a single rule of the event model 222 may be composed of multiple sub-rules. For example, a rule may include both a location-based rule and a temporal-based rule (e.g., a rule that defines an expected location at a particular time of the day). It should be appreciated, however, that the telematics server 102 may define additional or other rules during the unsupervised learning based on the observed data by identifying patterns and/or outliers in the received telematics data.

During or subsequent to the unsupervised learning of block 410, the telematics server 102 constructs or otherwise generates the event model 222 based on the various rules defined during such learning. In some embodiments, the telematics server 102 may also perform supervised training in which a user of the telematics server 102 may "label" the received telematics data to improve the creation of the initial set of event rules. Additionally, in embodiments in which a pre-trained event model 222 is used, the telematics server 102 may update the pre-trained model to construct or generate the final event model 222. Regardless, in block 426, the telematics server 102 subsequently saves the generated event model 222.

Figure 5:
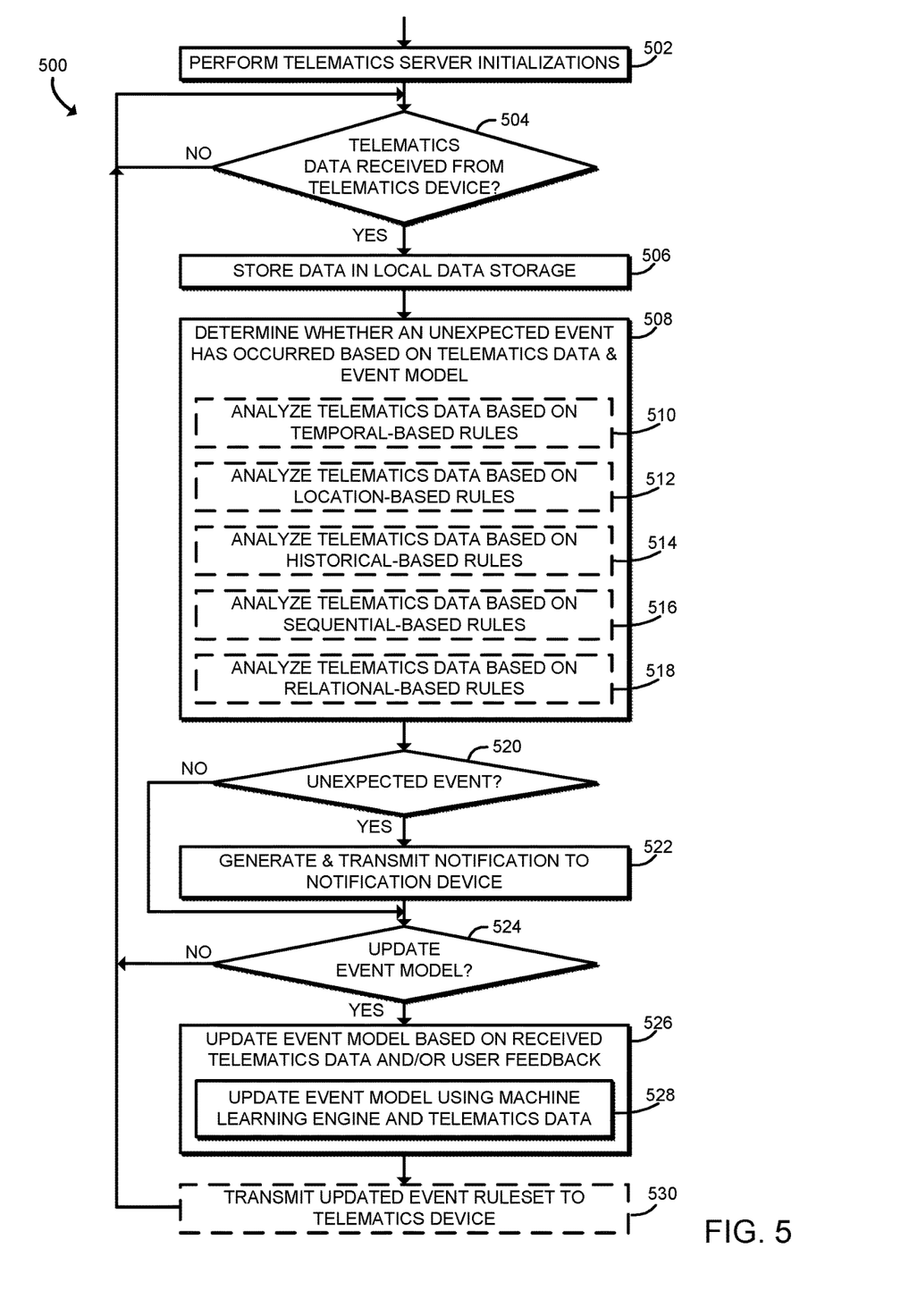
FIG. 5 is a simplified flow diagram of at least one embodiment of a method for providing notifications to a notification device that may be executed by the telematics server of the telematics system of FIGS. 1 and 2.

Referring now to FIG. 5, in use, the telematics server 102 may execute a method 500 for providing notifications to the notifications device 108. It should be appreciated that, in some embodiments, the operations of the method 500 may be performed by one or more components of the environment 202 of the telematics server 102 as shown in FIG. 2.

The method 500 begins with block 502, in which the telematics server 102 may perform various initializations procedures. For example, the telematics server 102 may load an operating system and/or various software or software extensions in block 502 as part of a power-up cycle. Subsequently, in block 504, the telematics server 102 monitors for telematics data from the telematics device 104. If telematics data is received in block 504, the method 500 advances to block 506 in which the telematics server 102 stores the received telematics data in the local telematics database 220.

Subsequently, in block 508, the telematics server determines whether an unexpected event has occurred based on the received telematics data and the event model 222. As discussed above, the event model 222 includes or defines a number of rules that define expected operational conditions and/or characteristics of the vehicle 106. If the received telematics data does not match the relevant event rule, the telematics server 102 determines that an unexpected event (e.g., unexpected telematics data) has occurred. As such, the telematics server 102 may compare the received telematics data to one or more rules of the event model 222. For example, the telematics server 102 may compare the received telematics data to one or more temporal-based rules in block 510, to one or more location-based rules in block 512, to one or more historical-based rules in block 514, to one or more sequential-based rules in block 516, to one or more relational-based rules in block 518, and/or to one or more additional rules.

In block 520, the telematics server 102 determines whether an unexpected event has been detected based on the analysis performed in block 508. If so, the method 500 advances to block 522 in which the telematics server 102 generates and transmits a notification to the notification device 108. As discussed above, the notification may be embodied as a simple alert notification and/or may provide instructions to the telematics device 104 for providing information to the driver of the vehicle 106.

If no unexpected event was detected in block 520 or after the notification has been transmitted in block 522, the method 500 advances to block 524. In block 524, the telematics server 102 determines whether to update the event model 222. In some embodiments, the telematics server 102 may update the event model 222 based on every received telematics data. In other embodiments, the telematics server 102 may be configured to periodically update the event model 222 or update the event model 222 after a particular amount of telematics data has been received. Additionally, if the user of the notification device 108 has provided feedback in response to a notification, the telematics server 102 may update the event model 222 based on such feedback so as to perform a type of supervised machine learning using the feedback as labeled data. Regardless, if the telematics server 102 determines to update the telematics data in block 524, the method 500 advances to block 526 in which the telematics server 102 updates the event model 222 based on the recently received telematics data and/or user feedback. For example, in the illustrative embodiment in block 528, the telematics server 102 updates the event model 222 based on the received telematics data and/or user feedback using the machine learning engine 216 (e.g., by using unsupervised or supervised learning, respectively). In doing so, the machine learning engine 216 may use any suitable machine learning algorithm to update the event model 222. In some embodiments, in block 530, the telematics server 102 may also transmit the updated event model 222 to the telematics device 104. In such embodiments, the telematics device 104 may utilize the updated event model 222 to perform some amount of local analysis of the telematics data as discussed above.

Figure 6:
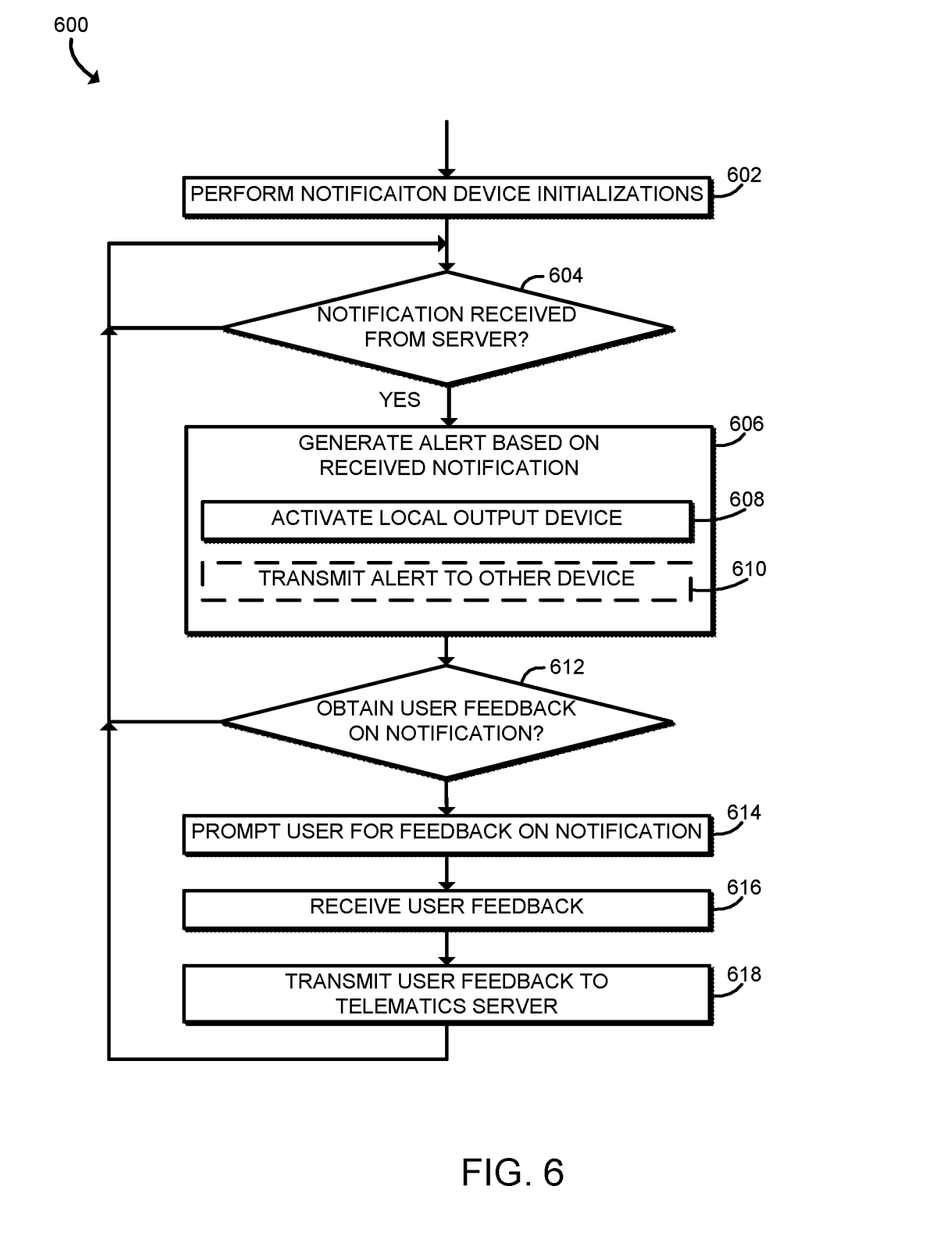
FIG. 6 is a simplified flow diagram of at least one embodiment of a method for managing notifications received from the telematics server that may be executed by the notification device of the telematics system of FIGS. 1 and 2.

Referring now to FIG. 6, in use, the notification device 108 may execute a method 600 for managing notifications received from the telematics server 102. As discussed above, the notification device 108 may be embodied as a separate computer device (e.g., a fleet manager server, a smartphone or mobile communication device, etc.) in some embodiments. In other embodiments, the notification device 108 may be incorporated into or otherwise embodied as the telematics device 104. In such embodiments, the telematics device 104 may execute the method 600. Regardless, it should be appreciated that the operations of the method 400 may be performed by one or more components of the environment 206 of the notification device 108 as shown in FIG. 2.

The method 600 begins with block 602, in which the notification device 108 may perform various initializations procedures. For example, the notification device 108 may load an operating system and/or various software or software extensions in block 402 as part of a power-up cycle. Subsequently, in block 604, the notification device 108 monitors for notifications received from the telematics server 102. If a notification is received, the method 600 advances to block 606.

In block 606, the notification device 108 generates an alert based on the received notification. For example, in block 608, the notification device 108 may activate an output device 178 to alert the user of the notification device 108 about the notification. The particular output device 178 used may be determined based on the notification and/or information included therein. As such, the alert may be embodied as a simple audible, visual, or tactile alert in embodiments in which the notification is a simple alert notification. However, in other embodiments in which the notification includes information, the alert may be embodied as the presentation of such information to the user via a respective output device 178 (e.g., via a speaker or display). Additionally or alternatively, in some embodiments, the notification device 108 may transmit the alert to other devices. For example, in embodiments in which the notification device 108 is located within the vehicle 106 or otherwise associated with the vehicle 106, the notification device 108 may be configured to transmit the alert to the telematics device 104, which may in turn generate the alert via one of the output devices 152.

Subsequently, in block 612, the notification device 108 determines whether to obtain user feedback regarding the received notification. For example, in some embodiments, the notification device 108 may request user feedback for each notification or request feedback only in response to particular criteria (e.g., the number of notifications received within a reference time frame). Additionally or alternatively, the user may manually provide feedback as desired. Regardless, it should be appreciated that the user feedback embodies a type of labeling of the notification, which may be used by the telematics server 102 to update the event model 222 using a supervised machine learning algorithm as discussed above.

If the notification device 108 determines to obtain user feedback in block 612, the method 600 advances to block 614 in which the notification device 108 prompts the user for feedback on the recently received notification. The notification device 108 subsequently receives the user feedback in block 616 and transmits the feedback to the telematics server 102 in block 618. The method 600 subsequently loops back to block 604 in which the notification device 108 continues to monitor for notifications from the telematics server 102.

Figure 7:
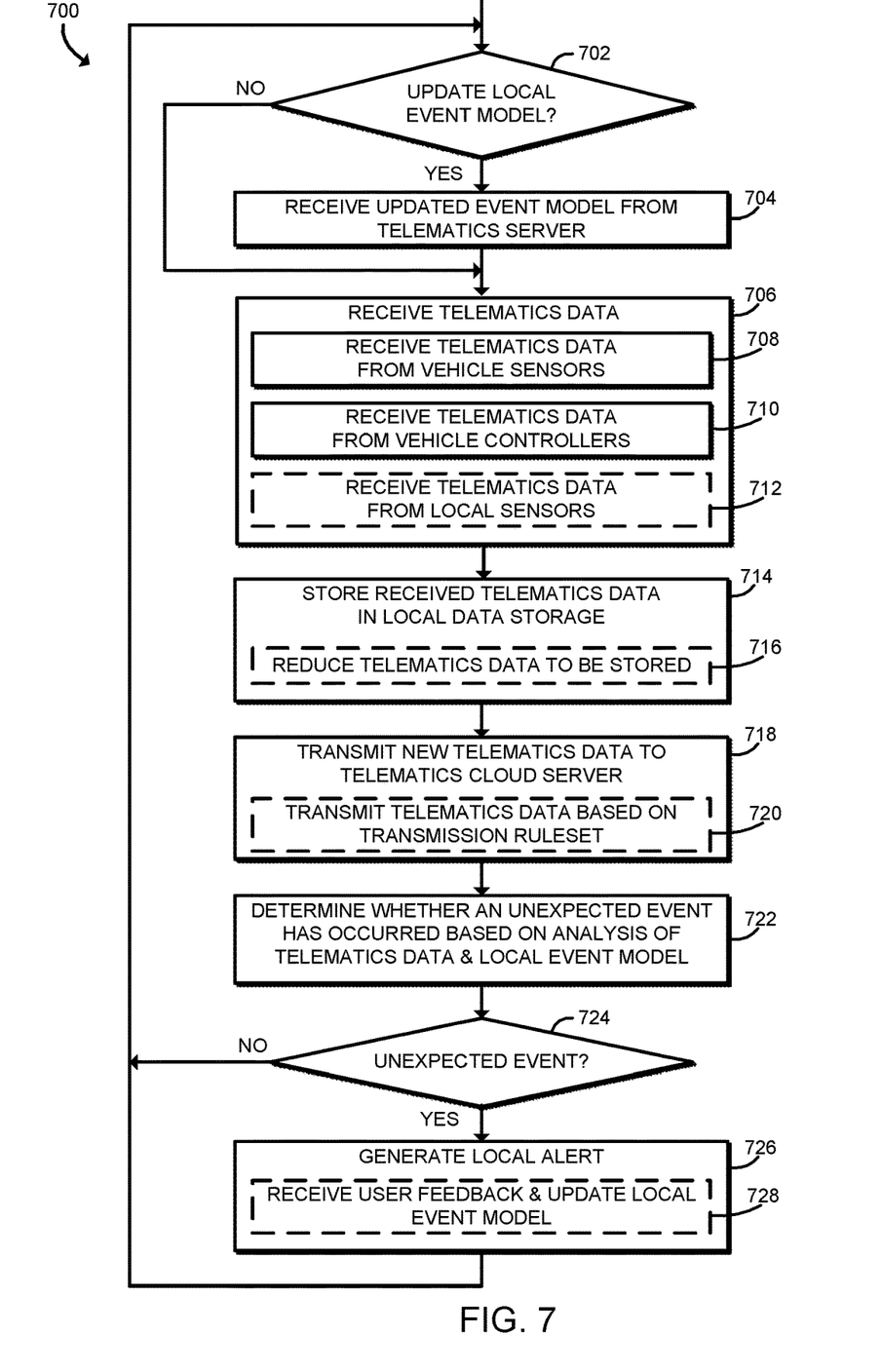
FIG. 7 is a simplified flow diagram of at least one additional embodiment of a method for managing telematics data that may be executed by the vehicle telematics device of the telematics system of FIGS. 1 and 2.

Referring now to FIG. 7, in embodiments in which the telematics device 104 is configured to perform the local analysis of the telematics data and includes the local event model 238, the telematics device 104 may execute a method 700 for managing telematics data. It should be appreciated that, in some embodiments, the operations of the method 700 may be performed by one or more components of the environment 204 of the telematics device 104 as shown in FIG. 2.

The method 700 begins with block 702, in which the telematics device 104 determines whether an update to the local event model 238 is available from the telematics server 102. If so, the method 700 advances to block 704 in which the telematics device 104 receives the updated event model 238 from the telematics server 104. Subsequently, in block 706, the telematics device 104 receives telematics data. For example, in block 708, the telematics device 104 may receive the telematics data from one or more vehicle sensors 164. Additionally or alternatively, in block 710, the telematics device 104 may receive the telematics data from one or more vehicle controllers 162. Additionally, in embodiments in which the telematics device 104 includes the local sensors 156, the telematics device 104 may receive telematics data from the local sensors 156 in block 712.

In block 714, the telematics device stores the received telematics data in the local database 240. In doing so, in some embodiments, the telematics device 104 may compact the telematics data in block 716 as discussed above. Subsequently, in block 718, the telematics device 104 transmits the newly received telematics data to the telematics server 102. In doing so and as discussed above, the telematics device 104 may be configured to transmit the telematics data as it is received from the sensors 164, controllers 162, and/or local sensors 156. Alternatively, in other embodiments in block 720, the telematics server 102 may be configured to transmit the telematics data based on a schedule set forth in the transmission ruleset 242 as discussed above.

Subsequently, in block 622, the telematics device 104 determines whether an unexpected event has occurred based on an analysis of the received telematics data and the local event model 238. To do so, the telematics device 104 may compare the received telematics data to one or more rules of the local event model 238 using a methodology similar to the telematics server 102 described above in regard to block 508 of method 500.

In block 724, the telematics device 104 determines whether an unexpected event has been detected based on the analysis performed in block 722. If so, the method 700 advances to block 726 in which the telematics device 104 generates an alert to the driver of the vehicle 106. As discussed above, the alert may be embodied as a simple alert notification and/or may provide information to the driver of the vehicle 106. Additionally, in some embodiments in block 728, the telematics device 104 may receive feedback from the driver of the vehicle 106 based on the generated alert and update the local event model 238 based on the feedback using a supervised machine learning algorithm as discussed above. Regardless, the method 700 subsequently loops back to block 702 in which the telematics device 104 continues to monitor for an updated event ruleset from the telematics server 102.

While the disclosure has been illustrated and described in detail in the drawings and foregoing description, such an illustration and description is to be considered as illustrative and not restrictive in character, it being understood that only illustrative embodiments have been shown and described and that all changes and modifications that come within the spirit of the disclosure are desired to be protected.

There are a plurality of advantages of the present disclosure arising from the various features of the methods, apparatuses, and systems described herein. It will be noted that alternative embodiments of the methods, apparatuses, and systems of the present disclosure may not include all of the features described yet still benefit from at least some of the advantages of such features. Those of ordinary skill in the art may readily devise their own implementations of the methods, apparatuses, and systems that incorporate one or more of the features of the present invention and fall within the spirit and scope of the present disclosure as defined by the appended claims.

The invention claimed is:

1. A telematics server for providing notifications to a telematics device of a vehicle, the telematics server comprising:
   an event model comprising a plurality of rules that each define an expected event associated with the vehicle, wherein the expected event defines at least one expected characteristic of the vehicle based on historical telematics data of the vehicle;
   a device interface configured to receive telematics data from the telematics device, wherein the telematics data defines at least one present characteristic of the vehicle and is indicative of an event associated with the vehicle; and
   a notification manager configured to determine whether the event is an expected event or an unexpected event based on the event model, wherein to determine whether the even is an expected event or an unexpected event comprises to (i) compare the telematics data to a rule of the plurality of rules, (ii) determine whether the at least one present characteristic of the vehicle matches the at least one expected characteristic of the vehicle defined by the expected event defined by the rule, (ii) determine that the event is an expected event in response to a determination that the at least one present characteristic matches the at least one expected characteristic of the event; and (iii) determine that the event is an unexpected event in response to a determination that the at least one present characteristic does not match the at least one expected characteristic of the vehicle, and
   wherein the device interface is further configured to transmit an event notification to a notification device different from the telematics device in response to a determination that the event is an unexpected event and to not transmit an event notification to the notification device in response to a determination that the event is an expected event such that the telematics sever is configured to transmit the event notification to the notification device only if the event is an unexpected event.

2. The telematics server of claim 1, wherein the notification manager is configured to update the event model based on the telematics data received from the telematics device or based on feedback received from the notification device using a machine learning engine.

3. The telematics server of claim 1, wherein the notification instructs the notification device to generate an alert.

4. The telematics server of claim 1, wherein the notification is configured to provide information related to the unexpected event to a user of the notification device.

5. The telematics server of claim 1, wherein the telematics server further includes a model manager comprising a machine learning engine configured to generate the event model based on the historical telematics data using unsupervised learning.

6. The telematics server of claim 1, wherein to analyze the telematics data comprises to analyze the telematics data based on a temporal-based rule of the event model, wherein the temporal-based rule defines an expected temporal event related to the vehicle based on the historical telematics data.

7. The telematics server of claim 1, wherein to compare the telematics data comprises to compare the telematics data to a location-based rule of the event model, wherein the location-based rule defines an expected location of the vehicle based on historical telematics data.

8. The telematics server of claim 1, wherein to compare the telematics data comprises to compare the telematics data to a historical-based rule of the event model, wherein the historical based rule defines an expected activity related to the vehicle based on the historical telematics data.

9. The telematics server of claim 1, wherein to compare the telematics data comprises to compare the telematics data to a sequential-based rule of the event model, wherein the sequential-based rule defines an expected event related to the vehicle given an occurrence of a prior event related to the vehicle.

10. The telematics server of claim 1, wherein to compare the telematics data comprises to compare the telematics data to a relational-based rule of the event model, wherein the relational-based rule defines an expected characteristic of the vehicle given a state of another characteristic of the vehicle.

11. A method for providing notifications to a telematics device of a vehicle, the method comprising:
    receiving, by a telematics server, telematics data from the telematics device, wherein the telematics data defines one or more characteristics of the vehicle and is indicative of an event associated with the vehicle;
    analyzing, by the telematics server, the telematics data using an event model managed by the telematics server to determine whether the event is an expected event or an unexpected event based on the event model, wherein the event model includes a plurality of rules that each define an expected event associated with the vehicle and the expected event defines at least one expected characteristic of the vehicle based on historical telematics data, and wherein analyzing the telematics data comprises:
       (i) comparing the telematics data to a rule of the plurality of rules,
       (ii) determining whether the at least one present characteristic of the vehicle matches the at least one expected characteristic of the vehicle defined by the expected event defined by the rule,
       (iii) determining that the event is an expected event in response to a determination that the at least one present characteristic matches the at least one expected characteristic of the event, and
       (iv) determining that the event is an unexpected event in response to a determination that the at least one present characteristic does not match the at least one expected characteristic of the vehicle;
    transmitting, by the telematics server, an event notification to a notification device different from the telematics device in response to a determination that the event is an unexpected event; and
    forgoing transmission of an event notification to the notification device in response to a determination that the event is an expected event such that the telematics server transmits the event notification to the notification device only if the event is an unexpected event.

12. The method of claim 11, further comprising updating, by the telematics server, the event model based on the telematics data received from the telematics device or based on feedback received from the notification device using a machine learning engine.

13. The method of claim 11, wherein the notification instructs the notification device to generate an alert or is configured to provide information related to the unexpected event to a user of the notification device.

14. The method of claim 11, wherein analyzing the telematics data comprises analyzing the telematics data based on a temporal-based rule of the event model, wherein the temporal-based rule defines an expected temporal event related to the vehicle based on the historical telematics data.

15. The method of claim 11, wherein analyzing the telematics data comprises analyzing the telematics data based on a location-based rule of the event model, wherein the location-based rule defines an expected location of the vehicle based on historical telematics data.

16. The method of claim 11, wherein analyzing the telematics data comprises analyzing the telematics data based on a historical-based rule of the event model, wherein the historical based rule defines an expected activity related to the vehicle based on the historical telematics data.

17. The method of claim 11, wherein analyzing the telematics data comprises analyzing the telematics data based on a sequential-based rule of the event model, wherein the sequential-based rule defines an expected event related to the vehicle given an occurrence of a prior event related to the vehicle.

18. The method of claim 11, wherein analyzing the telematics data comprises analyzing the telematics data based on a relational-based rule of the event model, wherein the relational-based rule defines an expected characteristic of the vehicle given a state of another characteristic of the vehicle.

19. One or more non-transitory, computer-readable storage media comprising a plurality of instructions that, in response to execution, cause a telematics server to:
receive telematics data from the telematics device, wherein the telematics data defines one or more characteristics of the vehicle and is indicative of an event associated with the vehicle;
analyze the telematics data using an event model managed by the telematics to determine whether the event is an expected event or an unexpected event based on the event model, wherein the event model includes a plurality of rules that each define an expected event associated with the vehicle and the expected event defines at least one expected characteristic of the vehicle based on historical telematics data, and wherein analyzing the telematics data comprises to:
(i) compare the telematics data to a rule of the plurality of rules,
(ii) determine whether the at least one present characteristic of the vehicle matches the at least one expected characteristic of the vehicle defined by the expected event defined by the rule,
(iii) determine that the event is an expected event in response to a determination that the at least one present characteristic matches the at least one expected characteristic of the event, and
(iv) determine that the event is an unexpected event in response to a determination that the at least one present characteristic does not match the at least one expected characteristic of the vehicle;
transmit an event notification to a notification device different from the telematics device in response to a determination that the event is an unexpected event; and
forego transmission of an event notification to the notification device in response to a determination that the event is an expected event such that the telematics server is configured to transmit the event notification to the notification device only if the event is an unexpected event.

20. The one or more non-transitory, computer-readable storage media of claim 19, wherein the plurality of instructions, in response to execution, further cause the telematics server to update the event model based on the telematics data received from the telematics device or based on feedback received from the notification device using a machine learning engine.

* * * * *